United States Patent
Nack

[11] 3,893,254
[45] July 8, 1975

[54] FISH HOOK SNELLING TOOL

[76] Inventor: Ronald L. Nack, 5015 W. Alaska Pl., Denver, Colo. 80219

[22] Filed: July 19, 1974

[21] Appl. No.: 489,851

[52] U.S. Cl. .................................................... 43/1
[51] Int. Cl. ........................................... A01k 91/04
[58] Field of Search ............................... 43/1, 57.5

[56] References Cited
UNITED STATES PATENTS

| | | | |
|---|---|---|---|
| 2,601,605 | 6/1952 | Fulvio | 43/1 |
| 2,734,299 | 2/1956 | Masson | 43/1 |
| 2,934,369 | 4/1960 | Kennedy | 43/1 X |

*Primary Examiner*—Louis G. Mancene
*Assistant Examiner*—Peter K. Skiff
*Attorney, Agent, or Firm*—C. B. Messenger

[57] ABSTRACT

A tool for convenient hand use when fish hooks are to be tied to a line or leader. A resilient power element for providing torsional and longitudinal forces is disposed within a hollow body and interconnected to a fish hook engaging spindle and a rotatable anchor. Vise slots on the body initially prevent rotation of the hook-spindle and any fish hook engaged thereto as the anchor is rotated in a first direction to store power in said resilient element. A fishing line looped through the eye of the fish hook will be wound about itself in a reverse direction when the spindle and hook are pulled longitudinally away from and free of the vise slots. Band power resilient elements and ratchet winding devices may be used.

11 Claims, 8 Drawing Figures

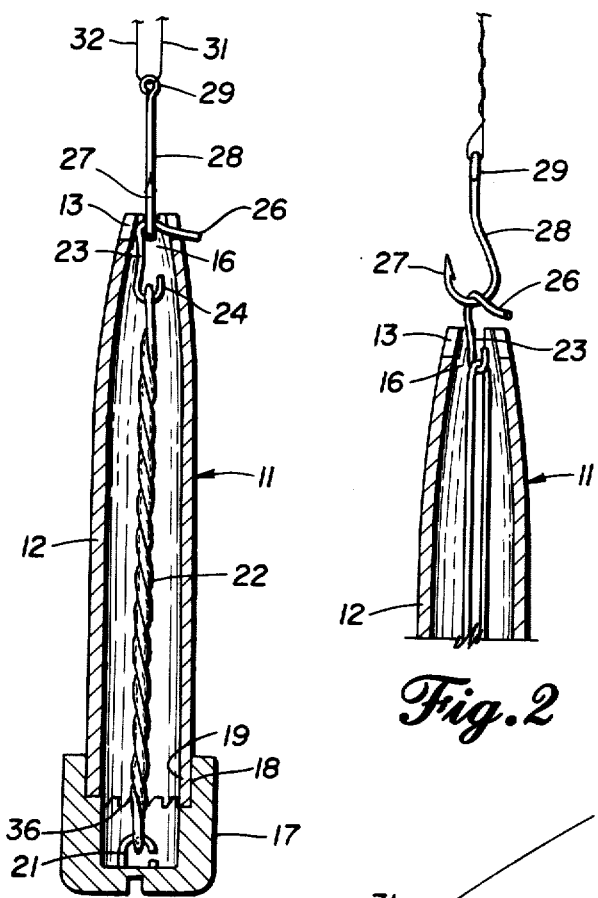
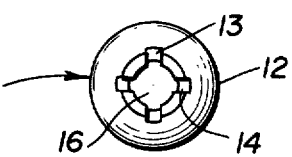
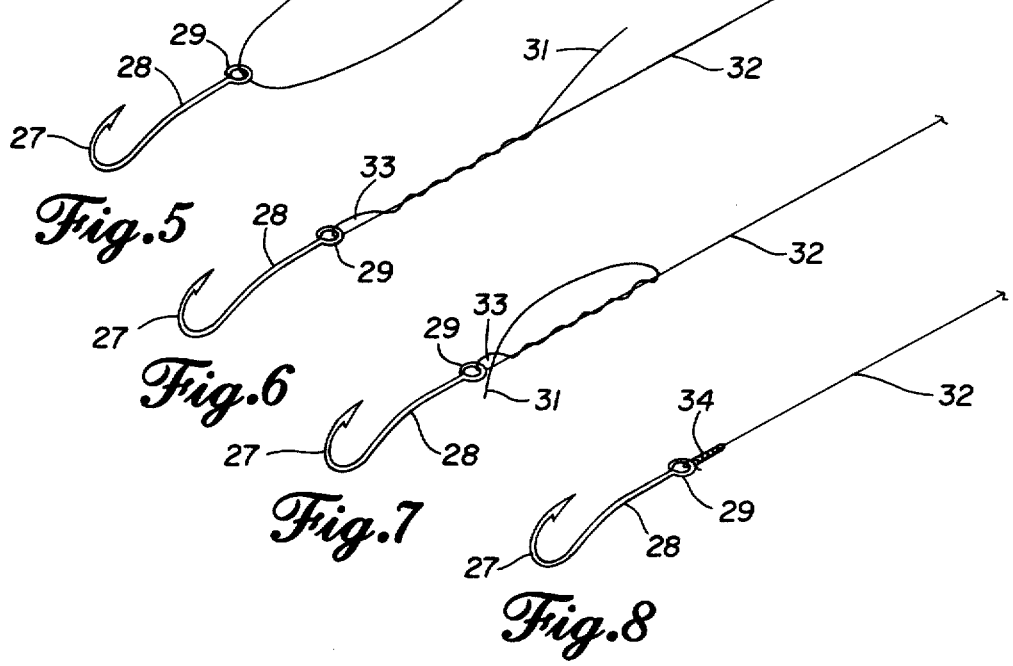

FISH HOOK SNELLING TOOL

BACKGROUND OF THE INVENTION

In connection with fishing activities it is often necessary to tie fish hooks to a line or leader. If flies or other lures are to be used or replaced, a fishing line must be interconnected to the hooked components that are to be used. In sport fishing the flies and lures are often of very small size, and it is, accordingly, difficult to manipulate the hooks as necessary to complete the various snelling knots or ties that are used. Since cold weather, wind or other adverse conditions are often encountered, various vise type devices have been used so the fisherman can complete the intricate maneuvers that may be necessary. The making of most snelling knots involves the wrapping of multiple turns of the line or leader about itself or about the shank of the fish hook. The present invention not only provides a convenient hand held fish hook vise, but it also facilitates the multi-turn winding steps used by fishermen so that an efficient and non-fish-disruptive tie is obtained.

SUMMARY OF THE INVENTION

A hollow bodied unit encloses a band power or other resilient element that can be used to provide longitudinal tension and rotational torsion forces. The resilient element is interconnected to a rotatable spindle and a rotatably movable anchor. Vise slots at one end of the device are adapted to receive the hook-spindle and a fish hook engaged thereto to prevent rotation thereof. With the hook-spindle held in the vise slots by the longitudinal resilient forces, rotational power can be applied to the anchor drive thus storing energy in the resilient element. Subsequently, if the fisherman loops the fishing line through the eye of a fish hook and then pulls on the loop to move the fish hook and hook-spindle longitudinally away from the vise slots, the fish hook will be rotated by the hook-spindle as the stored torsional forces in the resilient element are released. Thereafter a knot can be completed by the fisherman to provide an efficient tie. The longitudinal forces of the resilient element hold the fish hook engaged in the vise, and torsional forces of the resilient element provide a winding action.

BRIEF DESCRIPTION OF THE DRAWINGS

FIG. 1 is a side cross-sectional elevation of a preferred embodiment of the invention, FIG. 2 is a partial side cross-sectional elevation similar to that of FIG. 1 showing the fish hook removed from the position of vise engagement, FIG. 3 is a partial side elevation showing details of the vise slots, FIG. 4 is a top plan view of the vise slots, and FIGS. 5-8 show successive steps in the completion of a fishing line knot.

DESCRIPTION OF THE PREFERRED EMBODIMENT

An embodiment of the invention is shown in FIGS. 1-4 of the accompanying drawings. FIGS. 1 and 2 are illustrative of alternate positions or operational steps when the vise winding tool 11 is used to facilitate the tying of fish hooks to a fishing line or leader. The snelling tool has a hollow body 12 that is open at its opposite ends. At least one vise slot 13 is provided at one end of the tool. Actually a cross slot arrangement as shown is preferred. Cross slots 13 and 14 intersect at right angles and are disposed in position of registration with respect to the central hole or opening 16 that communicates with the hollow interior of the body. An anchor cap 17 is provided that closes the opposite end of the body 12. Anchor cap 17 has a central recess 18 which preferably is of a size just slightly greater than the external barrel size of the body 12 adjacent the end 19. Close engagement at recess 18 can provide a friction fit that normally prevents free rotation of the cap 17 with respect to the body 12.

A loop 21 or other engaging device is provided within the cap 17 to which a resilient element, such as the rubber band 22, may be engaged. The band 22 extends from the anchor cap 17 and its anchor loop 21 through the length of the body 12 and is at the vise end thereof engaged to a hook-spindle 23. The hook-spindle 23 has an eyelet end 24 through which the band 22 extends. The opposite end of the hook-spindle 23 is bent so that it has an outwardly extending arm 26. If the band 22 is tensioned, the spindle 23 will be drawn inwardly, and the arm 26 will be held in engagement between the walls of cross slots 13 or 14. The end of the arm 26, however, can still be engaged by the fisherman's finger or thumb nail, etc. to be held out of the vise slots, and, accordingly, the hook end 27 of a fish hook 28 may be passed under hook-spindle 23. Longitudinal tension forces in the resilient element or band 22 will pull the hook-spindle 23 and a hook 28 engaged thereto inwardly as the arm 26 of the hook-spindle 23 is engaged in cross slot 13. The hook end 27 of fish hook 28 is disposed at right angles with respect to spindle 23 and is itself then engaged in the cross slot 14.

When the fish hook 28 is held as shown in FIG. 1, the eyelet 29 of the fish hook will be held in steady position, and the fisherman can then pass the free end 31 of a fishing line 32 in looped arrangement through the eye 29. Previously or subsequently, anchor cap 17 is rotated with respect to the body 12. Such rotating movement will wind the band resilient element 22 to store torsional forces therein, and it will also increase the longitudinal tension exerted on the hook-spindle 23. When the fisherman wants to complete a knot tie for holding the fishing line 32 and the hook 28 together, the fisherman's thumb and forefinger can be applied to the fishing line and its free end to hold them in the looped configuration shown in FIG. 1. If the fishing line and hook is then pulled outwardly and away from the tool 11, the arm 26 of the hook-spindle and the hook end 27 will be withdrawn from the cross slots 13 and 14. As soon as these elements are withdrawn to the position shown in FIG. 2, the torsional force stored in the resilient element 22 will cause a reverse turning of the spindle 23 and, accordingly, of the hook 28, and the fishing line will be wound about itself as shown in FIG. 2.

The looped configuration of FIG. 1 is shown in FIG. 5, and the twisted configuration of FIG. 2 is again shown in FIG. 6. A tie or knot having good holding characteristics can be completed after said winding action if the free end 31 is then doubled back and introduced through the loop opening 33, which still exists in position close to the fish hook eyelet 29. When the free end is passed through the loop opening 33, the line 32 can be pulled and a tying knot 34 as shown in FIG. 8 will be completed.

While relatively large fish hooks, loops, etc. have been shown, the tool 11 is of special advantage when fish hooks of small size are being used. The crossed vise slots on a preferred embodiment of the invention will hold fish hooks of small size, such as No. 18 or No. 20 hooks, that are often used for artificial fly lures. The device can also be beneficially used with hooks of much larger size. To improve the hook holding features, the sidewalls of the vise slots 13 and 14 can be covered with a rubber or other resilient facing material 30 as shown in FIG. 3. With resilient jaw faces, small or large hooks will be securely held. The combined vise and winding features of the device are of special benefit when adverse (somewhat usual) fishing conditions are experienced. In cold, windy or wet weather the tool can be conveniently held in the fisherman's hand, and the tie operations are efficiently completed. The necessary finger manipulations are much easier to make when only a hook holding vise is provided. The additionally provided winding action further improves a fisherman's performance of the quite necessary hook typing operations.

The tension forces exerted by a rubber band resilient element tend to prevent undesired reverse rotation of the anchor cap 17 with respect to the body end 19. A close fit between these elements can provide a desired resistance to unwinding movement. If stronger bands are to be used to provide a greater number of winding turns, a ratchet and catch combination can be used at the interface between the anchor cap and body. Ratchet teeth 36 are shown in FIG. 1. These ratchet teeth can have a unidirectional clutching type configuration so the actual winding operations will not in any way be hindered. Since all unwinding of the band occurs at the opposite end of the tool, a single direction ratchet action is fully satisfactory. Under circumstances as in the present instance where both a longitudinal retaining force and a torsional force is to be used, a band type of resilient element is especially advantageous. The operative length of the band resilient element can, of course, be closely regulated in manufacture to provide the desired results. To obtain a properly regulated holding, winding and release action, it has been found desirable to use a band element of relatively high quality. Rubber bands made of surgical rubber of types presently used in medical fields are recommended. From the standpoint of uniformity of results and long operational or storage life, a high quality resilient element is desirable. Means other than the band powered resilient elements can, of course, be adapted for use in tools of the type herein described. It is also recognized that separate resilient elements can be used to provide the desired longitudinal tension and rotational torsion forces to provide power for the desired vise holding and hook turning operations.

I claim

1. A fishing tool for in-hand usage when tying a fishing line to a fish hook comprising a body unit, a fish hook engaging spindle rotatably mounted at a first end of said body and adapted to receive and hold a fish hook as a fishing line is applied thereto, an anchor element disposed at an opposite end of said body, a resilient element operatively interconnecting said spindle and anchor, means for prestoring torsional energy in said resilient element, and release means whereby the hook is rotated by the stored energy of said resilient means when the fishing line is to be tied to said hook.

2. The fishing tool as set forth in claim 1 wherein said body unit is of hollow construction.

3. The fishing tool as set forth in claim 1 wherein said spindle is reciprocally movable and said resilient means additionally provides tension forces holding said spindle inwardly with respect to said body.

4. The fishing tool as set forth in claim 3 wherein said resilient means is of a band power type.

5. The fishing tool as set forth in claim 3 wherein said anchor element is rotatable.

6. The fishing tool as set forth in claim 3 and further comprising a vise slot in the first end of said body for receiving and holding said fish hook.

7. The fishing tool as set forth in claim 6 and further comprising resilient sidewalls for said vise slot.

8. The fishing tool as set forth in claim 6 wherein said release means is inclusive of an extension arm for said spindle.

9. The fishing tool as set forth in claim 8 and further comprising crossed vise slots for said body with the extension arm of said spindle and said hook being disposed and held in said vise slots by the tension forces of said resilient element.

10. The fishing tool as set forth in claim 9 wherein said anchor element is rotatable for prestoring the torsional energy in said resilient element.

11. The fishing tool as set forth in claim 10 and further comprising ratchet means for said tool adapted to facilitate the prestorage of torsional energy in said resilient element.

* * * * *